(12) United States Patent
Donze

(10) Patent No.: US 6,530,345 B2
(45) Date of Patent: Mar. 11, 2003

(54) TANGLE-FREE LEAD DEVICE FOR A LEASH

(76) Inventor: William E. Donze, 1113 Industrial Pkwy. N., P.O. Box 785, Brunswick, OH (US) 44212

( * ) Notice: Subject to any disclaimer, the term of this patent is extended or adjusted under 35 U.S.C. 154(b) by 0 days.

(21) Appl. No.: 09/799,823

(22) Filed: Mar. 5, 2001

(65) Prior Publication Data

US 2001/0022160 A1 Sep. 20, 2001

Related U.S. Application Data

(60) Provisional application No. 60/186,726, filed on Mar. 3, 2000.

(51) Int. Cl.[7] .................................................. A01K 1/08
(52) U.S. Cl. .......................... 119/774; 24/905; 119/772
(58) Field of Search ................................. 119/772, 774, 119/779, 769, 792; 24/265 H, 598.1, 598.5, 905; D30/153

(56) References Cited

U.S. PATENT DOCUMENTS

| | | | | |
|---|---|---|---|---|
| 234,738 A | * | 11/1880 | Bales | 24/165 |
| 558,822 A | * | 4/1896 | Linkenbach | 24/165 |
| 760,171 A | * | 5/1904 | Atwell | 24/165 |
| 913,680 A | * | 3/1909 | Belcher | 119/769 |
| 1,686,424 A | * | 10/1928 | Thomson et al. | 24/136 R |
| 4,641,875 A | * | 2/1987 | Speich | 24/197 |
| 4,868,954 A | * | 9/1989 | Kasai | 24/265 H |
| 5,546,639 A | * | 8/1996 | Lacore et al. | 24/265 H |
| 5,548,875 A | * | 8/1996 | Hart et al. | 24/265 H |
| 5,852,988 A | * | 12/1998 | Gish | 119/795 |
| 5,901,668 A | * | 5/1999 | Goodger | 119/795 |
| 6,003,474 A | * | 12/1999 | Slater et al. | 119/792 |
| 6,030,015 A | * | 2/2000 | Fujikawa et al. | 24/197 |
| 6,250,256 B1 | * | 6/2001 | Lin | 119/769 |
| 6,286,190 B1 | * | 9/2001 | Friend et al. | 24/115 F |
| 6,308,662 B1 | * | 10/2001 | Furman | 119/776 |
| 6,318,301 B1 | * | 11/2001 | Jackson et al. | 119/772 |
| 6,371,056 B1 | * | 4/2002 | Phillips | 119/793 |
| 6,460,488 B1 | * | 10/2002 | Manzell et al. | 119/798 |

* cited by examiner

Primary Examiner—Charles T. Jordan
Assistant Examiner—Judith Nelson
(74) Attorney, Agent, or Firm—Hahn Loeser + Parks LLP; Stephen L. Grant

(57) ABSTRACT

A tangle free lead device has a coupler with first and second bores in axial alignment. A first linear element is rotatably received in the first bore and a second linear element is rotatably received in the second bore. A head on each linear element, positioned in a central aperture of a main body of the coupler retains the linear element axially in the coupler. The relative position of the heads of the respective elements also delimit the axial movement of the linear elements relative to each other.

11 Claims, 1 Drawing Sheet

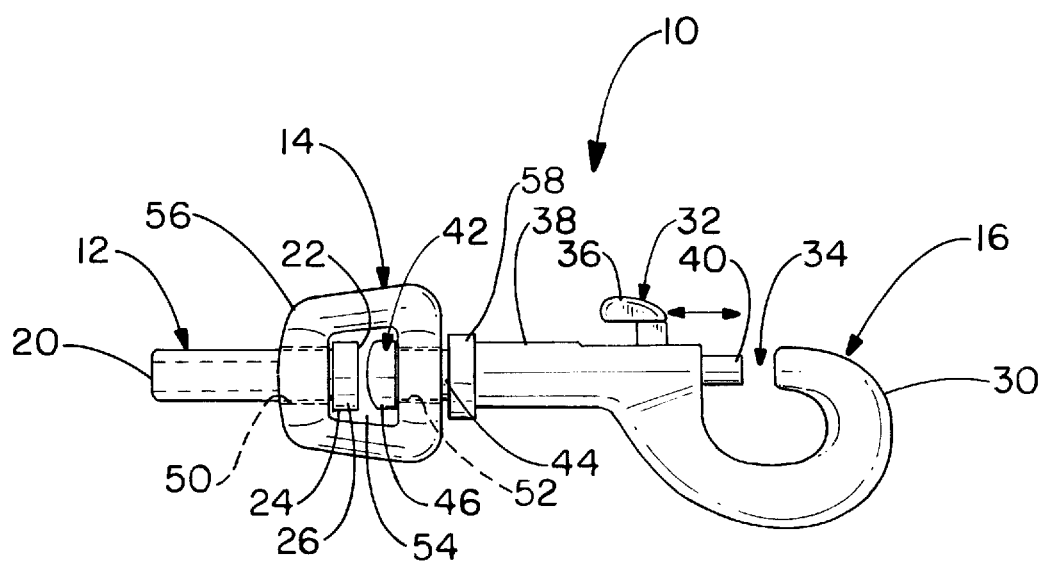

TANGLE-FREE LEAD DEVICE FOR A LEASH

This application claims the benefit of provisional application No. 60/186,726 filed Mar. 3, 2000.

The present invention relates to a lead device to be used in association with a leash, animal tie-out system or the like. The present invention features a double-swivel coupling which allows tangle-free operation of the device.

BACKGROUND OF THE ART

In the prior art, it is well known to provide a lead of cable, leather or the like which attaches to a collar or harness for a dog or other animal. To allow free movement of the animal and to prevent injury or even death of the animal from unintentional entanglement, it is critical to provide a tangle-free coupling of the lead to the collar or harness. Prior devices have failed to provide tangle-free operation at each side of the coupling.

SUMMARY OF THE INVENTION

An advantage of the present invention is to provide an in-line coupling between a snap ring device and a lead, wherein the snap ring and the lead each are capable of freely rotating about the axis of the coupling. This and other features of the present invention are provided by a lead device for a leash or the like, comprising a sleeve, a lead head and a coupler. The lead head has a generally closed bight at a first end thereof. The coupler has first and second bores. The sleeve is rotatably received in the first bore and the lead head is rotatably received in the second bore, such that the sleeve and the lead head are maintained in alignment relative to an axis of the coupler, but the lead head and sleeve are rotatable independent of the coupler about the axis.

In some embodiments of the device, the coupler comprises a main body containing the first and second bores and defining a central aperture.

In some embodiments, the sleeve has a first end adapted to receive the leash or the like and a second end that is rotatably retained in the first bore by an abruptly larger head which has an external diameter larger than an internal diameter of the first bore, with the second end head situated in the central aperture of the coupler.

In some of these embodiments, the larger head is integrally formed on the sleeve, while in other embodiments, the larger head is provided by a bolt, a shaft portion of the bolt threadingly received in the second end of the sleeve.

In some embodiments of the invention, the lead head has a second end rotatably retained in the first bore by an abruptly larger head which has an external diameter larger than an internal diameter of the second bore, with the second end head situated in the central aperture of the coupler. In many of these embodiments, the larger head is provided by a bolt, a shaft portion of the bolt threadingly received in the second end of the lead head. In some of the embodiments, the lead head further comprises a stop element on a shaft portion thereof, positioned to coact with the larger head to limit axial movement of the lead head in the second bore.

In another aspect of the invention a "no tangle" lead device comprises first and second linear elements and a coupler. The coupler has first and second bores, the first linear element rotatably received in the first bore and the second linear element rotatably received in the second bore, such that the first linear element and second linear element are maintained in alignment relative to an axis of the coupler, but the lead head and sleeve are rotatable independent of the coupler about the axis.

BRIEF DESCRIPTION OF THE DRAWINGS

The present invention will be best understood when reference is made to the detailed description of the invention and the accompanying drawings, wherein identical parts are identified by identical reference numbers and wherein the single FIGURE is a front elevation view of the present invention device.

DETAILED DESCRIPTION OF THE INVENTION

The FIGURE shows a front elevation view of the present invention 10. Starting at one end of the device 10 and moving to the opposite end, the device comprises a lead receiving sleeve 12, a coupler 14, and a lead head 16. Specific details of the individual pieces will now be described.

The lead receiving sleeve 12 is typically of hollow metal composition, with a first end 20 and a second end 22. The first end 20 may be internally threaded or otherwise adapted to securely receive the cable or lead (not shown) which will typically run to a handle in the case of a leash, or to an anchor device in the case of an animal tie out. In some cases, the adaptation will include the ability of the sleeve 12 to be crimped into frictional engagement of the cable or lead. In some other cases, the cable or lead will be adhesively bonded into the sleeve 12, through the use of a known adhesive or through a process such as soldering. Sleeve 12 will typically be of uniform exterior diameter along its length. The second end 22 will have a head 24 of abruptly larger diameter than the exterior of the sleeve 12. This may be accomplished in several manners. In one case, the head 24 is integrally formed on the sleeve 12. In another case, second end 22 may be internally threaded to receive a bolt 26, wherein the bolt possesses a head 24 of larger diameter than the exterior of the sleeve.

Lead head 16 is of a generally conventional design and will be easily recognized. Lead head 16 comprises a generally closed bight 30, with a means 32 for selectively opening an aperture 34 in the bight. In the particular embodiment shown in the FIGURE, the opening means 32 is a bolt action, which is opened by movement of a tang 36 against a biaser (not shown) positioned inside a shaft portion 38 of the lead head 16. As tang 36 is moved against the urging of the biaser, bight portion 40 moves, opening aperture 34. In another known opening means which is not specifically illustrated, the aperture 34 will be opened by deflection of the tang 36 away from an inside surface of thr bight 30, the tang normally being held in contact with the inside surface by a biaser, which may actually be a part of the tang itself. Such a tang 36 in this latter example typically pivots about an end of the aperture 34.

At the end of lead head 16 opposite the bight 30, shaft portion 38 is provided with an internally threaded opening for receiving a bolt 42 with a shaft 44 and a head 46, wherein the head has a larger diameter than the shaft.

Coupler 14 is a device that has a pair of axially aligned bores 50, 52, with a central aperture 54 between the bores, a main body 56 of the coupler 14 containing the bores and surrounding the central aperture. If the bores 50, 52 were smaller and internally threaded and the bolts 26, 42 received in them were engaged in that threading, then coupler 14 would act similarly to a turn buckle. However, the bolts 26, 42 will be sized so that their respective shafts 12, 44, will rotate freely in the bores 50, 52, yet the respective heads 24, 46, will not be able to pass through the bores. As shown clearly in the FIGURE, these heads 24, 46 may be positioned so that they are in the central aperture 54 with their respective bolts 26, 42, effectively axially aligned by the bores 50, 52. In addition to stop elements, such as the one shown as 58 on shaft portion 38, the size of the central aperture is such that the heads 24, 26, each limit the other to a small amount of axial movement. As a result of the connection of lead receiving sleeve 12 and lead head 14 through coupler 14, both the lead receiving sleeve and the lead head may rotate freely and independently of each other about an axis defined by bores 50, 52 in the coupler.

In a typical application of the device 10 of the present invention, the sleeve 12 will receive a cable or lead, particularly a cable that is attached to a pet "tie out" system or the like, as will be well known in the art. The openable bight 30 in the lead head 16 can receive a further leash for a pet or, more typically, a collar for a pet, especially a ring in a collar. Because the coupler 14 connects the lead head 16 to the sleeve 12 in an axially aligned, but rotatably independent, manner, either the lead head or the sleeve may rotate about the axis without causing rotation of the other. By this device, therefore, a "no-tangle" lead device is provided.

It will also be seen from the foregoing that the device 10 of the present invention comprises a first linear element 12 and a second linear element 16, the respective first and second linear elements being held in axial alignment relative to each other by a coupler 14. The coupler 14 has a first bore 50 and a second bore 52 which are axially aligned in a main body 56 of the coupler such that each of the bores 50, 52, opens into a central aperture 54. An abruptly larger head 24, 46, on the respective first and second linear elements has an external diameter which is larger than an internal diameter of the respective first and second bores 50, 52. When the first linear element 12 is positioned in the first bore 50, the larger head 24 of the first linear element is positioned in the central aperture 54. When the second linear element 16 is positioned in the second bore 52, the larger head 46 of the second linear element is positioned in the central aperture 54. In such an alignment, the axial dimension of the central aperture is such the larger heads 24, 46 abut each other after only a small amount of axial movement. However, the portions of the first and second linear elements which pass through the respective first and second bores have external diameters smaller than the internal diameters of the bores so as to permit the linear elements to rotate freely in the respective bore. Thus, the coupler 14 retains the first and second linear elements in axial alignment, limits the relative axial movement of the first and second linear elements, but allows the first and second linear elements to rotate independently about the axis of the coupler.

While the best mode has been described as required by the patent laws, the scope of the invention is not to be determined by the preceding, but is instead to be measured according to the accompanying claims.

What is claimed is:

1. A lead device for a leash, said lead device comprising:
   a sleeve;
   a lead head with a generally closed bight at a first end thereof; and
   a coupler having first and second bores with the sleeve rotatably received in the first bore and the lead head rotatably received in the second bore, such that the sleeve and the lead head are maintained in alignment relative to an axis of the coupler, but the lead head and sleeve are rotatable independent of the coupler about the axis.

2. The lead device of claim 1, wherein the coupler comprises a main body containing the first and second bores and defining a central aperture.

3. The lead device of claim 2, wherein the sleeve has a first end adapted to receive the leash and a second end which is rotatably retained in the first bore by an abruptly larger head which has an external diameter larger than an internal diameter of the first bore, with the second end head situated in the central aperture of the coupler.

4. The lead device of claim 3, wherein the larger head is integrally formed on the sleeve.

5. The lead device of claim 3 wherein the larger head is provided with a bolt, a shaft portion of the bolt threadingly received in the second end of the sleeve.

6. The lead device of claim 2, wherein the lead head has a second end rotatably retained in the first bore by an abruptly larger head that has an external diameter larger than an internal diameter of the second bore, with the second end head situated in the central aperture of the coupler.

7. The lead device of claim 6, wherein the larger head is provided by a bolt, a shaft portion of the bolt threadingly received in the second end of the lead head.

8. The lead device of claim 7, wherein the lead head further comprises a stop element on a shaft portion thereof, positioned to coact with the larger head to limit axial movement of the lead head in the second bore.

9. A lead device for a leash, said lead device comprising:
   a sleeve with a first end adapted to receive a cable and a second end;
   a lead head with a generally closed bight at a first end thereof; and
   a coupler comprising a main body with a first and a second bores and defining a central aperture, with the sleeve rotatably received in the first bore by an abruptly larger head of the sleeve which has an external diameter larger than an internal diameter of the first bore, and a second end of the lead head rotatably received in the second bore by an abruptly larger head which has an external diameter larger than an internal diameter of the second bore, with the respective larger heads each situated in the central aperture of the coupler, such that the sleeve and the lead head are maintained in alignment relative to an axis of the coupler, but the lead head and sleeve are rotatably independent of the coupler about the axis.

10. A no-tangle lead device, comprising:
    a first linear element;
    a second linear element; and
    a coupler having first and second bores, the first linear element rotatably received in the first bore and the second linear element rotatably received in the second bore, such that the first linear element and second linear element are maintained in alignment relative to an axis of the coupler, but the second linear element and the first linear element are rotatable independent of the coupler about the axis.

11. The lead device of claim 9, wherein the generally closed bight is closed by a bolt action snap.

* * * * *